UNITED STATES PATENT OFFICE.

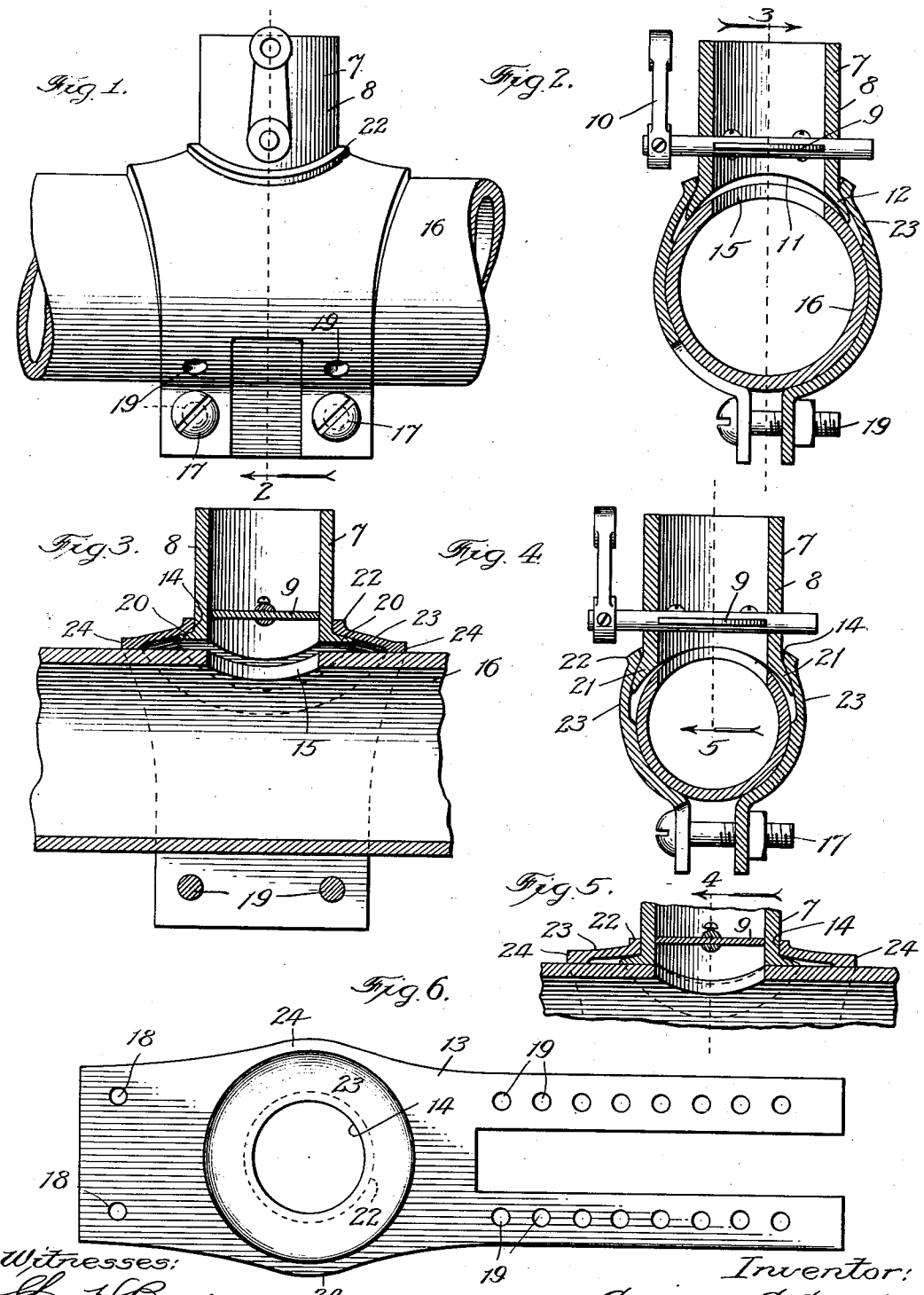

GARDNER S. CHAPIN, OF CHICAGO, ILLINOIS.

PIPE-COUPLING.

1,057,708. Specification of Letters Patent. Patented Apr. 1, 1913.

Application filed August 14, 1912. Serial No. 715,015.

*To all whom it may concern:*

Be it known that I, GARDNER S. CHAPIN, a citizen of the United States, residing at Chicago, in the county of Cook and State of Illinois, have invented a new and useful Improvement in Pipe-Couplers, of which the following is a specification.

My invention relates to devices for coupling pipes together in angular relation, it having been devised for use, more especially, for coupling muffler cut-out valves to the exhaust-pipes of internal combustion engines, though I do not wish to be understood as intending to limit it to such use. In providing such cut-out valves on the exhaust-pipes of engines openings are made in the walls of the exhaust-pipes and cut-out valves attached to the latter to register at their open casings with said openings in the exhaust-pipes and extend at angles to the latter. As exhaust-pipes of different engines are of varying diameters, it is necessary in accordance with the present practice where cut-out valves are manufactured as a stock article, to make them of a number of sizes corresponding to the different diameters of exhaust-pipes to be equipped in order that the casings of the valves shall fit the contour of the exhaust-pipes to which they are to be applied.

My object is to provide coupling-means for pipes to be connected together at an angle to each other, which shall be simple of construction, economical of manufacture, readily applied to the pipes, produce the desired tightness of joint and, especially as regards cut-out valves, render unnecessary the manufacture of said valves in many different sizes for exhaust-pipes of varying diameters.

Referring to the accompanying drawings—Figure 1 is a view in side elevation of an exhaust-pipe of an internal combustion engine equipped with a cut-out valve coupled to said pipe by coupling-means constructed in accordance with my invention, the pipe illustrated being of one of the larger sizes. Fig. 2 is a section taken at the line 2 on Fig. 2 and viewed in the direction of the arrow.
Fig. 3 is a section taken at the line 3 on Fig. 2 and viewed in the direction of the arrow. Fig. 4 is a view similar to Fig. 2 of an exhaust-pipe of one of the smaller sizes equipped with a cut-out valve coupled therewith by my improved coupling-means. Fig. 5 is a section taken at the line 5 on Fig. 4 and viewed in the direction of the arrow; and Fig. 6, a plan view of a portion of my improved coupler.

In carrying out my invention in the preferred manner, I enlarge the cut-out valve-casing at its arc-shaped coupling-end and fit over said casing and into engagement with its enlarged section, a saddle formed of metal capable of flexibly conforming to the exhaust-pipe and thus hugging the enlarged end of said casing and the exhaust-pipe when drawn at its free ends tightly about the pipe, thus forming relatively-tight joints between the exhaust-pipe and said saddle and the latter and the enlarged end of said casing, and thereby rendering unnecessary the accurate fitting of the valve-casing against the curved side of the pipe.

In the accompanying drawings I have shown my improved coupling-means as applied to pipes having larger and smaller diameters respectively, than those against which the cut-out valve would accurately fit, in order that the possibilities of my improvement where pipes of widely differing diameters are to be equipped with cut-out valves, may be clearly disclosed.

A cut-out valve which may be of any suitable construction is represented at 7, the valve illustrated comprising a pipe-section 8 forming a valve-casing and containing a butterfly valve 9 adapted to be operated at its crank-section 10 as from a foot-lever (not shown) on the dash-board of an automobile.
The coupling-end of the casing 8 at which the latter is to be fitted against the exhaust-pipe to be equipped therewith is made of an arc-shape, as represented at 11, and is provided externally with an endless flange 12, to render it enlarged, it being preferred that the curvature of the end 11, be such as to cause it to conform to a side of an exhaust-pipe of a size intermediate the largest and smallest sized pipes to which the cut-out valves are to be applied, though it will readily be understood from the following description that this is not necessary for where the valves are to be applied to exhaust-pipes having relatively slightly varying diameters, the curvatures of the ends of the valve-casings 8 may be such as to conform, as desired, to the contour of either the largest or smallest pipes to be equipped. The coupling of the valve-casing 8 to an exhaust-pipe is effected by means of a saddle 13 formed of a material capable of flexibly conforming to the exhaust pipe to which it is applied, preferably soft steel, the saddle containing an opening 14 of a diameter slightly greater than the external diameter of the unflanged portion of the valve-casing 8.

To use my improved coupling-means a hole 15 is first made in the side of the exhaust-pipe to be equipped with a cut-out, as for example the pipes represented at 16. The unflanged end of the valve-casing 8 is then inserted through the opening 14 in the saddle 13 and the casing 8 with the saddle assembled therewith as stated, applied to the pipe 16 to cause its open curved end 11 to register with the opening 15 in the pipe 16. The ends of the saddle 13 are then bent around the pipe 16 and tightly drawn together, as by means of bolts, represented at 17 and extending through holes 18 and 19 in the ends of the saddle 13. Thus drawing together the ends of the saddle 13 causes it to be drawn into tight and snug engagement with the upper surface of the flange 12 and at its marginal edges and end-portions with the pipe 16 for producing a relatively tight joint between the casing 8 and pipe 16.

It will be understood from the foregoing that it is immaterial that the casing 8 accurately fit the pipe 16, as the joint is made between the saddle 13 and the pipe 16 and casing 8, and thus a cut-out valve may be coupled to any one of a number of pipes of varying diameters and a relatively tight joint be produced.

It is preferred that the flange 12 be of the form illustrated, viz., that it be relatively sharp, as indicated at 20 along its elevated portion, and slant upwardly as indicated at 21 along its lower portion, thus preventing sharp bends in the saddle 13 when the latter is applied to the casing 8 and pipe 16, by reason of the fact that the saddle 13 lies on the sharp flanges 20 adjacent to the center of the pipe 16 substantially parallel therewith, whereas at the sides of the exhaust-pipe 16 where the saddle 13 is more nearly parallel with the casing 8, the flange 21 conforms to its position.

It will be manifest from the foregoing description that the saddle 13 may be of any form provided it will snugly fit the flange 12 and pipe 16 as hereinbefore stated; but it is preferred that it be of the form illustrated in which the edge of the metal surrounding the opening 14 is formed with a bead or rib 22 and intermediate said rib and the marginal edges of the strip and surrounding the rib 22 is of reduced thickness to form a relatively thin annular web 23 flanked by ribs 24 at the edges of the saddle 13. By thus constructing the saddle 13 the latter will readily bend at those portions of the latter where it is required that it bend to cause the strip to conform to and make a tight joint with the flange 12 on the casing 8 and with the pipe 16 as hereinbefore explained.

What I claim as new and desire to secure by Letters Patent is,—

1. Means for coupling muffler cut-out valves to the exhaust-pipes of internal combustion engines, comprising, in combination, a pipe containing a valve and having an enlarged coupling end, and a saddle of flexible material containing an opening of less diameter than the enlarged end of said coupling pipe, whereby said saddle is adapted to fit over said coupling pipe and in tight engagement with the enlarged portion thereof, and to fit conformingly about the pipe to which said first-named pipe is to be coupled.

2. Means for coupling muffler cut-out valves to the exhaust-pipes of internal combustion engines, comprising, in combination, a pipe containing a valve and having an enlarged coupling end, and a saddle of flexible material containing an opening of less diameter than the enlarged end of said coupling pipe, whereby said saddle is adapted to fit over said coupling pipe and in tight engagement with the enlarged portion thereof and to fit conformingly about the pipe to which said enlarged pipe is to be coupled, and means for drawing the ends of the saddle into tight engagement to cause the saddle to conform to the pipe to which said first-named pipe is to be coupled.

3. Universal coupling means for coupling branch pipes to pipes of different diameters, comprising, in combination, a pipe provided externally, at its coupling end, with a continuous flange, and a saddle of flexible material containing an opening at which it is adapted to fit over said pipe and in engagement with said flange, and adapted to fit conformingly about the pipe to which said flanged pipe is to be coupled.

4. Universal coupling means for coupling branch-pipes to pipes of different diameters, comprising, in combination, a pipe provided externally, at its curved coupling-end, with an endless flange conforming generally to the curvature of the coupling-end of said pipe, the elevated portion of said flange being relatively abrupt and the lower portions of said flange being relatively slanting, and a saddle of flexible material containing an opening at which it is adapted to fit over said pipe and in engagement with said flange, and adapted to fit conformingly about the pipe to which said flanged pipe is to be coupled.

5. The combination of a pipe containing an opening in its side, a branch-pipe positioned at an end thereof and at an angle to said first-named pipe, against the side of the latter and in registration with the opening therein, and having its coupling end enlarged, and a saddle of flexible material containing an opening through which said branch-pipe extends, and fitting at the marginal edges of its opening against said enlarged portion of said branch-pipe, and at its outer marginal edges and end-portions against said first-named pipe, for the purpose set forth.

6. The combination of a pipe containing an opening in its side, a branch-pipe positioned at an end thereof and at an angle to said first-named pipe, against the side of the latter and in registration with the opening therein, and having its coupling end enlarged, and a saddle of flexible material containing an opening through which said branch-pipe extends, and means engaging with the saddle for drawing the latter at its opening into engagement with the enlarged portion of said branch-pipe, and for causing said saddle to conformingly fit said first-named pipe, for the purpose set forth.

7. In coupling means for the purpose set forth, a saddle-member formed of flexible material and containing a pipe-receiving opening, said saddle being formed with an annular rib surrounding said opening, and with ribs at the opposed sides of said saddle flanking said annular rib.

8. In coupling means for the purpose set forth, a saddle-member formed of flexible material and containing a pipe-receiving opening, said saddle being formed with an annular rib surrounding said opening and a relatively thin annular web-portion surrounding said rib and extending intermediate the latter and the opposed lateral edges of said saddle.

GARDNER S. CHAPIN.

In presence of—
J. LANDESMAN,
R. A. SCHAEFER.